United States Patent [19]

Price et al.

[11] 4,392,119
[45] Jul. 5, 1983

[54] APPARATUS AND METHOD FOR MONITORING THE ARRIVAL AND DURATION OF STAY OF A VEHICLE AT A DRIVE-IN WINDOW

[75] Inventors: Ronn Price, West Chester; Gary Brown, Springboro; Andrew A. Muraski, Middletown, all of Ohio; William C. Muraski, Olathe, Kans.

[73] Assignee: U.S. Computer Systems, Inc., Cincinnati, Ohio

[21] Appl. No.: 273,645

[22] Filed: Jun. 15, 1981

[51] Int. Cl.³ .............................................. G08B 21/00
[52] U.S. Cl. ............................... 340/38 L; 336/84 M; 340/22; 364/401
[58] Field of Search ...................... 340/38 L, 31 R, 22, 340/51; 364/401; 235/92 TC; 336/92, 84 M

[56] References Cited

U.S. PATENT DOCUMENTS

| | | | |
|---|---|---|---|
| 3,090,935 | 5/1963 | Lekens | 336/92 |
| 3,663,936 | 5/1972 | Boudouris et al. | 340/31 R |
| 3,673,036 | 3/1954 | Thompson | 235/92 TC |
| 3,720,913 | 3/1973 | Bradford | 340/31 R |
| 4,021,644 | 5/1977 | Dreslinski | 235/92 TC |
| 4,064,501 | 12/1977 | Yost et al. | 340/51 |

Primary Examiner—Glen R. Swann, III
Attorney, Agent, or Firm—Frost & Jacobs

[57] ABSTRACT

Apparatus for sensing the arrival of a motor vehicle at the pick-up window of a drive-thru business and providing a visual display of the length of time that the motor vehicle is present at the window. Visual and audible alarms apprise operating personnel that the vehicle has been present for a predetermined length of time. The apparatus also totals and displays the number of vehicles as well as the total duration of stay of all vehicles arriving at the pick-up window.

The motor vehicles are sensed by means of a vertically oriented rectangular loop detector positioned beneath the pick-up window adjacent the vehicle approach lane. The detector senses the metallic sides of the approaching vehicle, and is shielded to prevent spurious signals.

The apparatus finds particular application for improving the working efficiency of operating personnel of the drive-in business.

61 Claims, 11 Drawing Figures

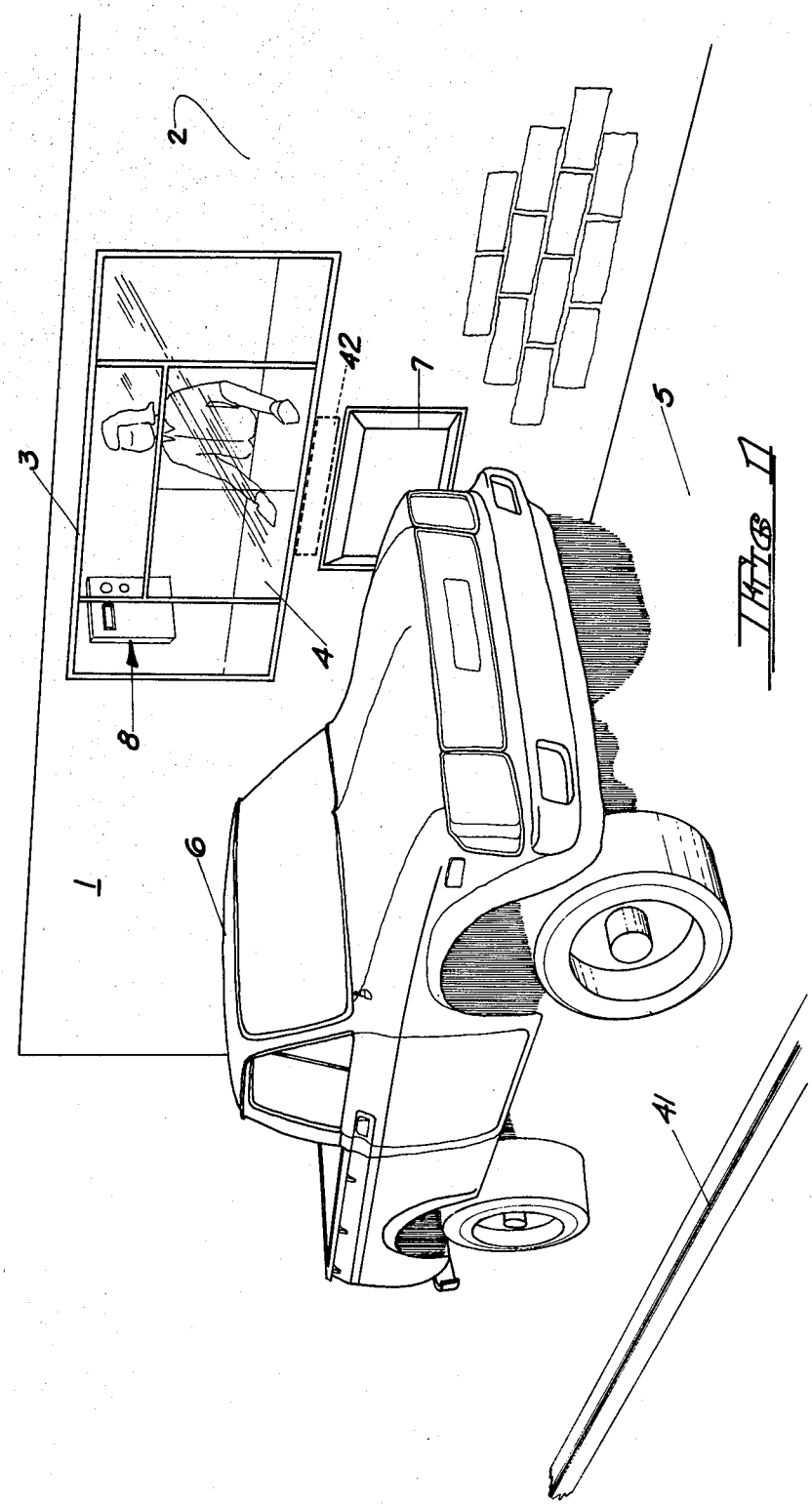

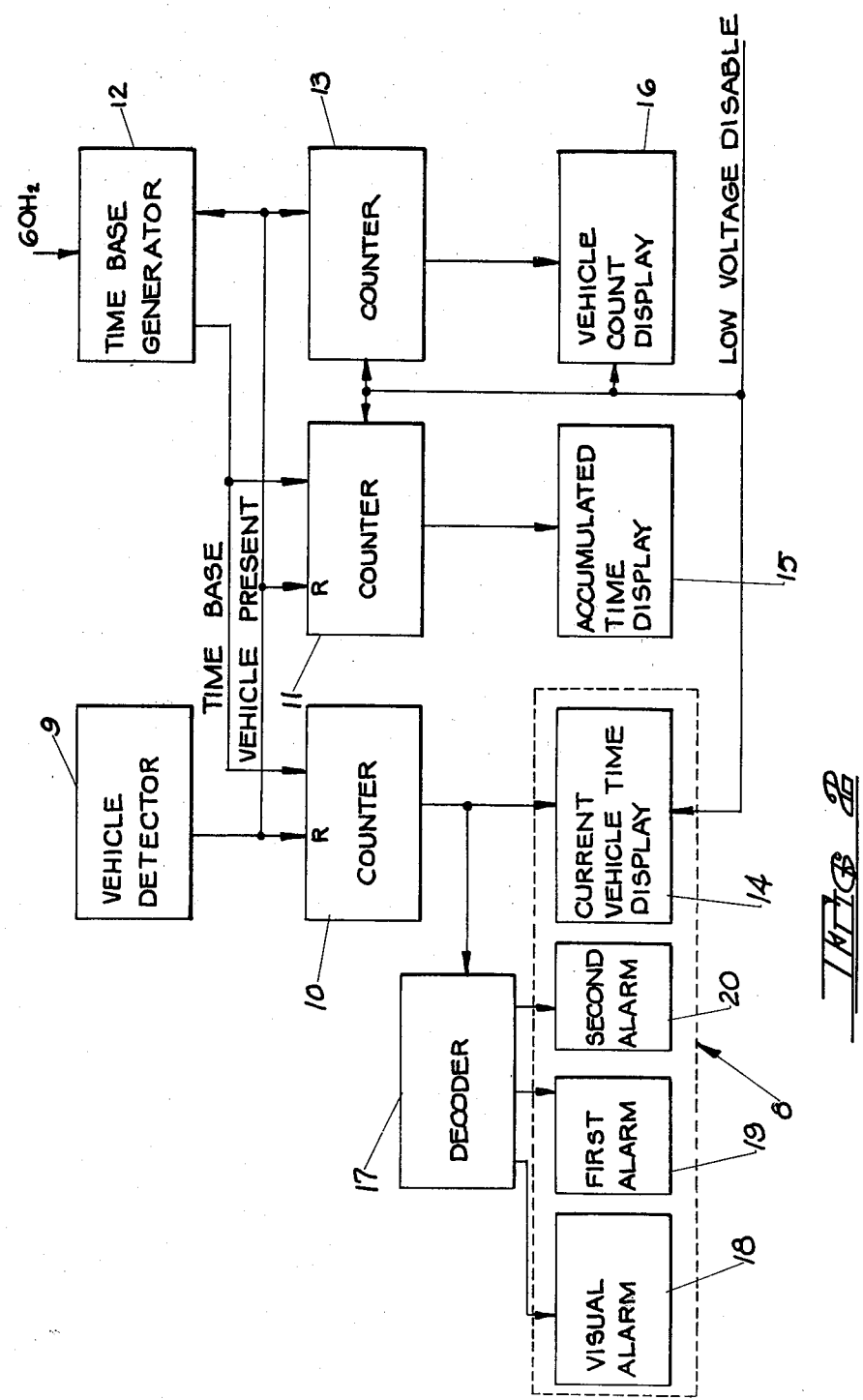

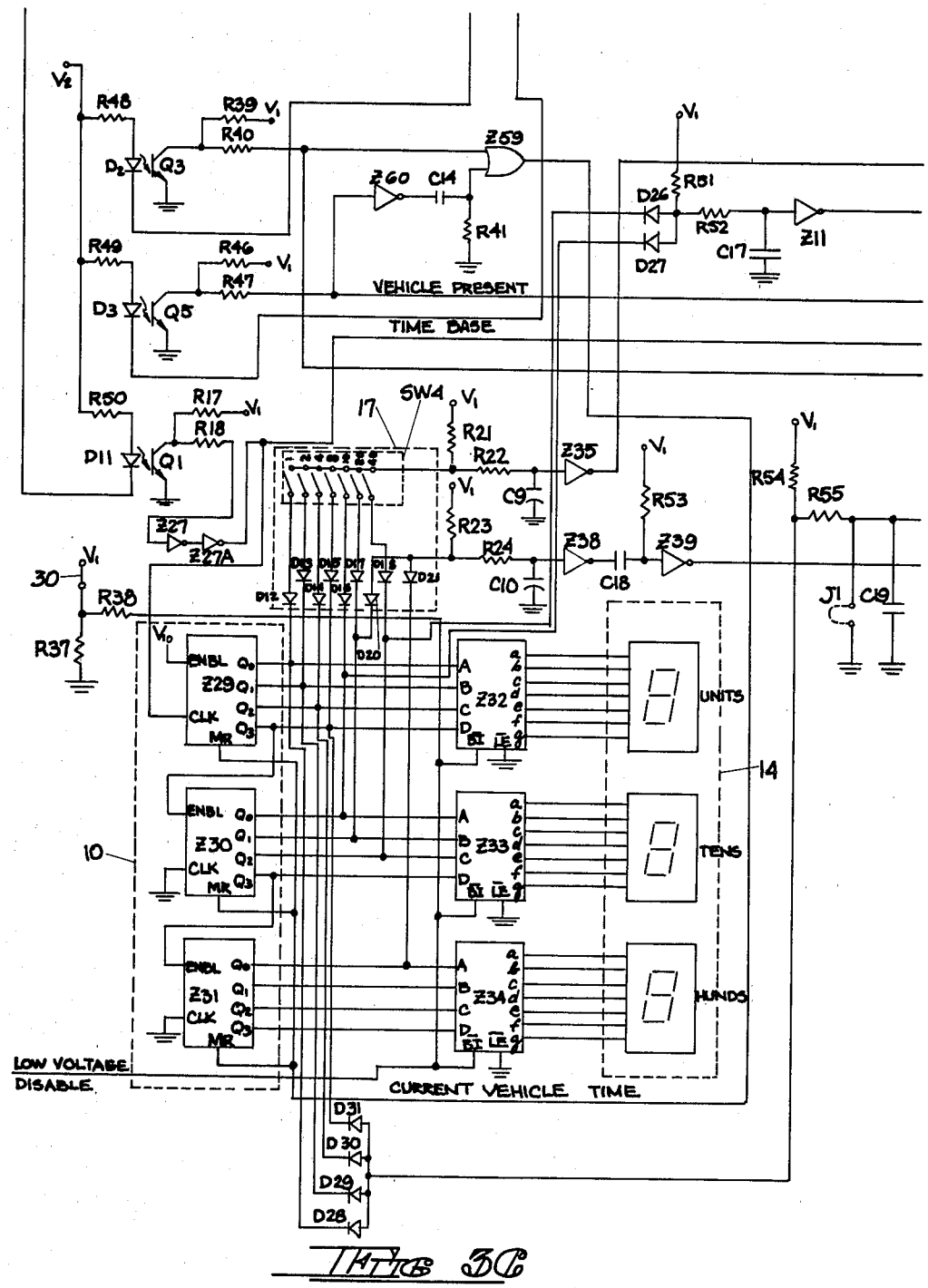

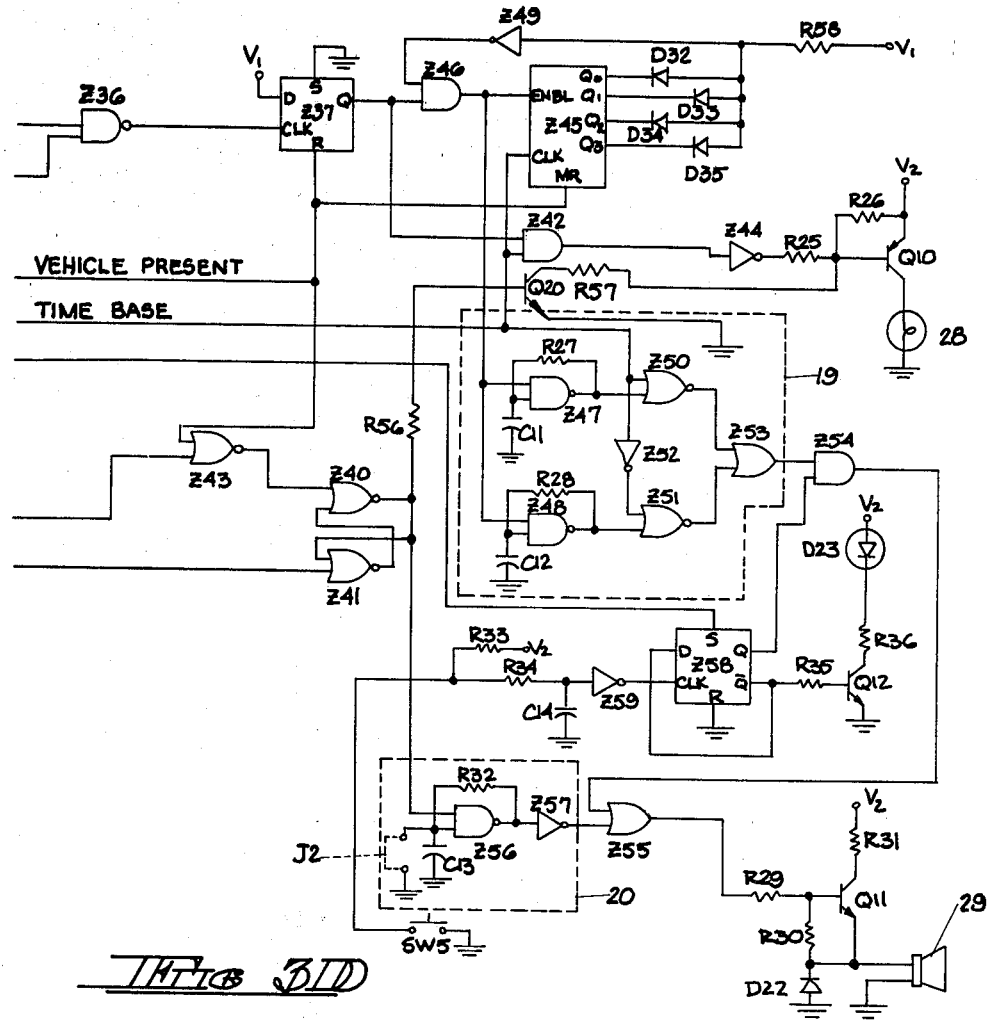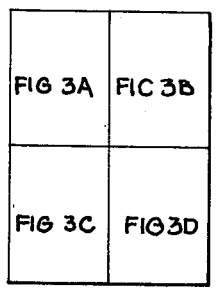

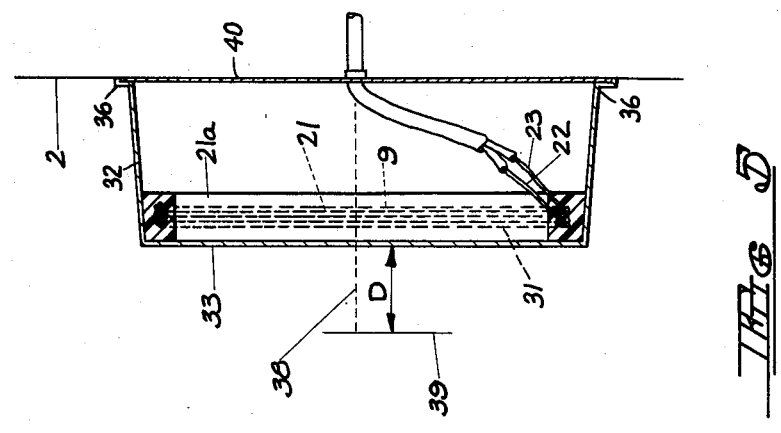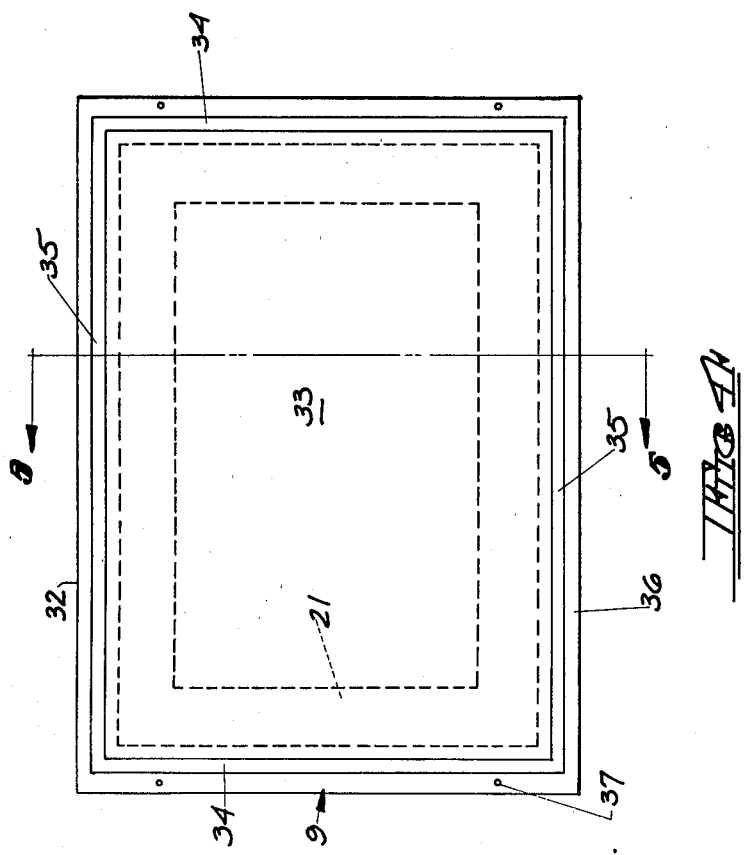

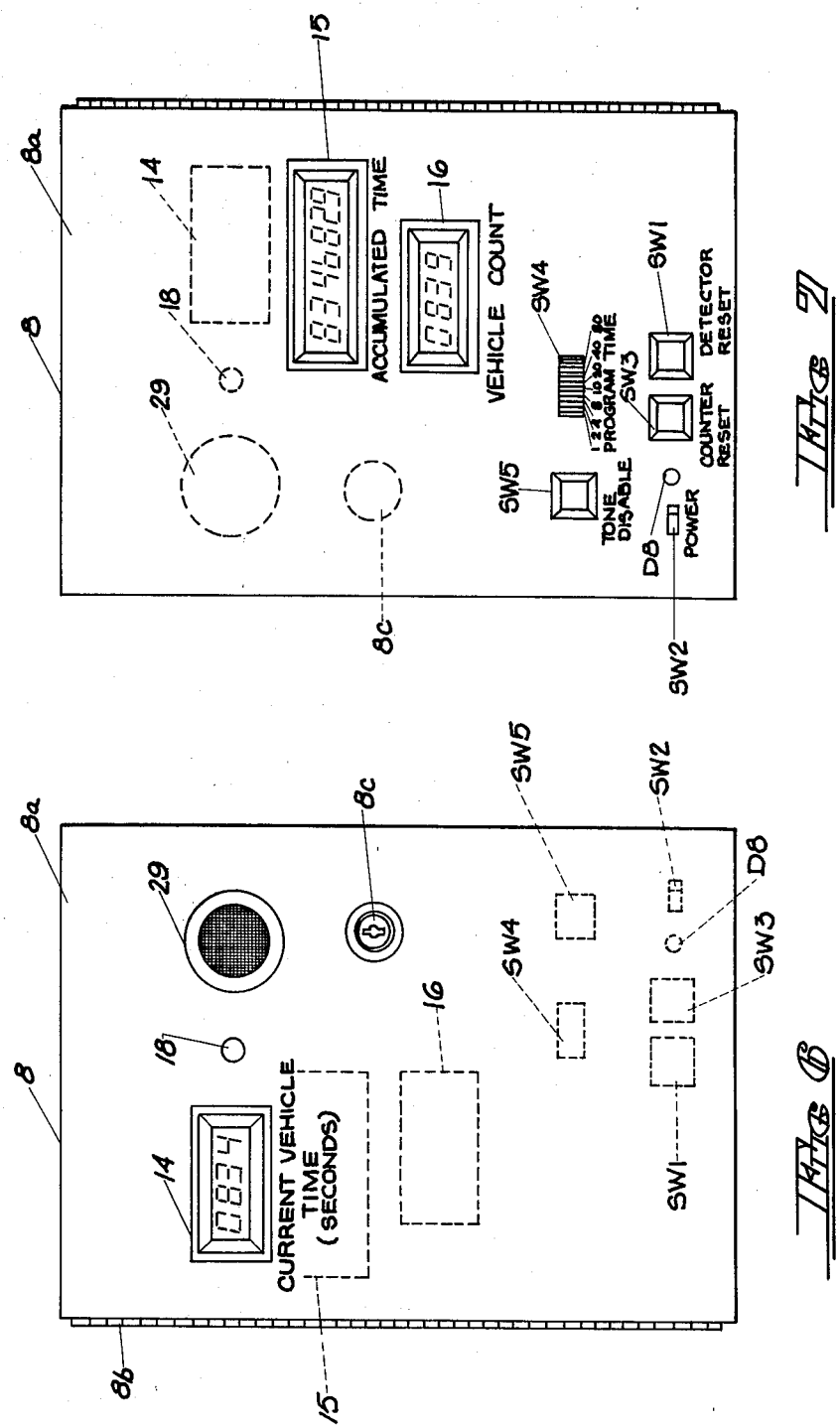

APPARATUS AND METHOD FOR MONITORING THE ARRIVAL AND DURATION OF STAY OF A VEHICLE AT A DRIVE-IN WINDOW

SUMMARY OF THE INVENTION

The present invention is directed generally to sensing and monitoring apparatus particularly for use with a business having a drive-in window, and more specifically to such apparatus including displayed counting and timing means for improving the working efficiency of the drive-in business personnel.

The apparatus and method of the present invention have specific application to restaurant-type businesses having a drive-in window where food orders may be placed and picked up without leaving a motor vehicle. Often such installations make use of a menu board or order station where the food order may be placed to be picked up at a subsequent pick-up window.

Usually it is necessary to sense the presence of a motor vehicle at the order station or pick-up window. This is often accomplished by means of a relatively large rectangular shaped loop detector comprising a plurality of turns of wire which is buried in a generally horizontal plane beneath the surface of the restaurant driveway or approach lane. When the metallic undercarriage of a motor vehicle interrupts the magnetic field created by the loop detector, a change in electrical characteristics is created which may be monitored and utilized to signal restaurant personnel of the presence of the vehicle.

While such loop detector systems have long been employed for detecting the presence of a motor vehicle or the like, they have been found to be subject to certain undesirable drawbacks. For example, in original installations the loop detector is cast as a part of the driveway or approach lane. In retrofit applications, a channel or trench must be cut into the concrete or macadam surface of the driveway, and the loop detector embedded in place by means of adhesive or other filler material. In either case, installation of the loop detector becomes a relatively expensive and time consuming operation. Furthermore, the loop detector is subject to deterioration or breakage caused by expansion and contraction of the driveway material under varying temperature and load conditions. Often an entire portion of the driveway must be replaced in order to repair a relatively minor break or short in the loop detector.

Ways have also been sought to improve the operating efficiency of the personnel associated with such businesses in order to reduce the delay between the time the vehicle is detected and the delivery of goods or services to the vehicle. For example, in the case of a drive-in bank, it is desirable to complete the banking transaction in a minimum amount of time following the arrival of the vehicle at the drive-in window in order to be able to serve as many customers as possible. Likewise, in the case of a drive-in restaurant, it is desirable to deliver the food order as quickly as possible following arrival of the vehicle at the pick-up window, again to be able to serve as many customers as possible, as well as to assure prompt delivery of hot food.

In its broadest sense, the present invention is designed to gauge and consequently improve the services rendered at a business having a drive-in window, particularly a fast food restaurant's drive-thru window. The invention includes a display visible by all restaurant personnel showing the time that a particular car has been waiting at the window. The total accumulated waiting time of cars at the window, as well as the total car count is also displayed on displays capable of being read and reset by management personnel only. From this information an average service time per vehicle can be calculated. In addition, the present invention also provides an audible alarm signal when the waiting time of the car at the service window exceeds a predetermined time limit. The visible displays and audible alarms permit the employees of the business to work against specific time objectives, and consequently improve the speed and efficiency of the drive-thru operation. The data retained by the apparatus also serves as a check against the car count retained by the cash register, thus serving as a form of protection against internal theft. The present invention consequently provides store management with the capability to determine daily demand patterns and to detect trends; to isolate periods of efficient and inefficient operation; to quantify performance for purposes of an incentive plan or contest; and to warn supervisory, management and operation personnel that a vehicle has been waiting for longer than a predetermined time.

In a preferred embodiment, the apparatus is specifically directed to monitoring the arrival and duration of stay of a motor vehicle at a transaction station associated with a drive-in business or the like of the type having a building structure including a vertical wall mounting a drive-in window, and a vehicle approach lane positioned alongside the building structure wall. The apparatus includes monitor means in the form of a vertically oriented magnetic or inductive loop detector producing an electrical signal upon the arrival of a motor vehicle at the transaction station. In one embodiment, the loop detector is mounted on the inner front face of a plastic box-like enclosure of trapezoidal cross section so as to space the loop detector from the outer building wall. The rear wall of the enclosure is formed of a ferrous material so as to shield the loop detector, and prevent false signals from metallic objects which may be moved inside the building. The loop detector is mounted with its normal axis substantially parallel to the ground at a position vertically spaced so as to sense the side of the motor vehicle as it enters the transaction station.

Means are provided responsive to the electrical signal produced by the monitor means for timing a duration of stay commencing with the arrival of the vehicle at the transaction station. The timing means includes a digital display which shows the actual time that the vehicle has been present at the service window. When the vehicle leaves the window, the total time of duration is held on the display, and is reset when a subsequent vehicle arrives. This display is visible by the restaurant personnel.

When the vehicle has been at the window for a predetermined length of time, visual and audible alarms are activated to notify the operating personnel. Furthermore, at the end of a predetermined length of time, a second distinguishable type of alarm is sounded or displayed to notify the personnel that the time objective has been exceeded.

The present invention also includes means for totaling and displaying the time duration of stay of successive vehicles at the transaction station, as well as means for totaling and displaying the total number of vehicles which arrive at the transaction station. In the preferred embodiment, this information is made available to and may be reset by management personnel only.

While for purposes of an exemplary showing, the present invention has bleen described and illustrated in connection with a drive-in restaurant business, it will be understood that it may be utilized with other types of drive-in businesses such as banks etc.

Further features of the invention will become apparent from the detailed description which follows.

BRIEF DESCRIPTION OF THE DRAWING

FIG. 1 is a fragmentary perspective view of a drive-in restaurant incorporating the monitoring apparatus of the present invention.

FIG. 2 is a block diagram of the monitoring apparatus of the present invention.

FIGS. 3A-3D represents an electrical schematic diagram of the monitoring apparatus of the present invention.

FIG. 3E illustrates the manner in which FIG. 3A—FIG. 3D should be arranged to form the schematic diagram.

FIG. 4 is a front elevation view of the sensing means of the present invention.

FIG. 5 is a cross sectional view taken along section line 5—5 of FIG. 4.

FIG. 6 is a front elevation view of the display panel of the present invention.

FIG. 7 is a rear elevation view of the door assembly of the display panel of the present invention.

DETAILED DESCRIPTION

Figure 3A:
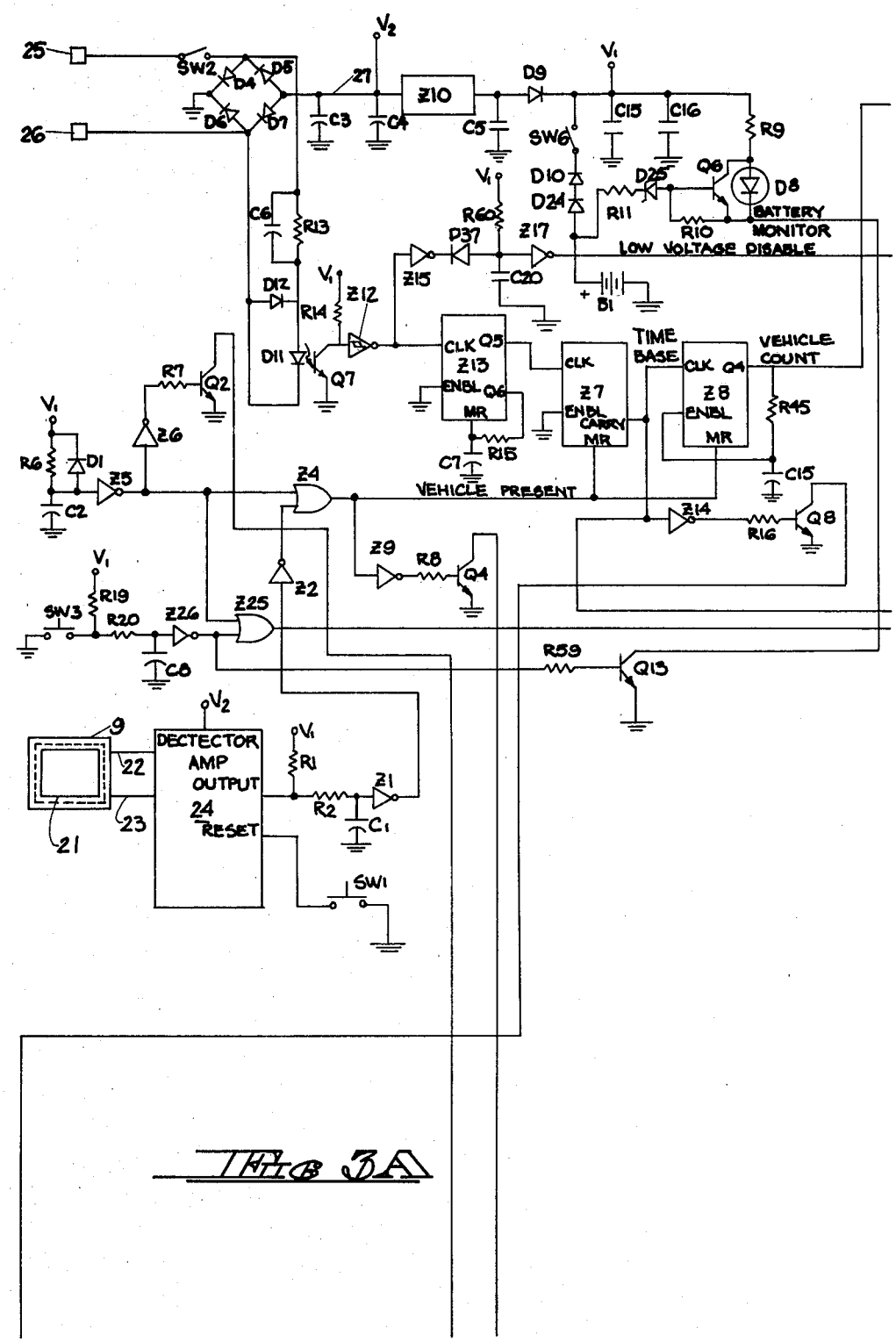
Figure 3B:
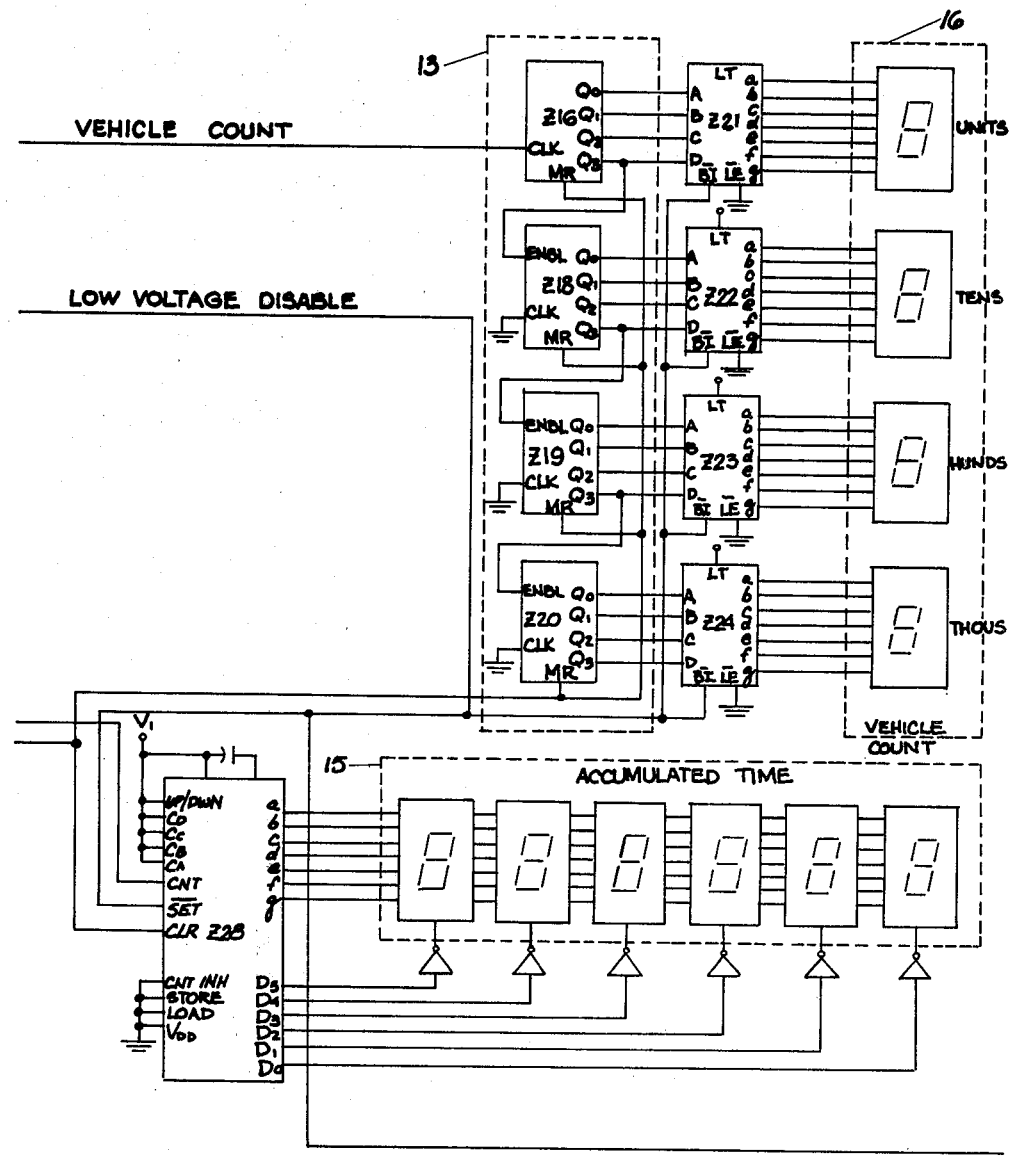

FIG. 1 illustrates an installation incorporating the present invention in a restaurant having a drive-thru or drive-in window. The restaurant includes a conventional building 1 having the usual equipment where the food or other products are prepared and packaged for carry-out. One wall of the restaurant building 1 includes a vertical wall 2 in which is mounted a generally rectangular window 3 having a sliding portion 4 through which the package may be handed to the occupant of the vehicle by an attendant within the building. A driveway or vehicle approach lane 5 extends alongside the building wall to permit vehicles to drive up to window 3. Generally, approach lane 5 is of sufficient length to accommodate several successive vehicles, one of which has been illustrated at 6 in FIG. 1.

In many instances, a menu board (not shown) listing various items to be purchased will be located along the approach lane at a distance from the pick-up window. A sensor may be associated with the menu board station to detect the arrival of a motor vehicle. In many cases, the sensor represents a magnetic or inductive loop detector formed from a plurality of turns of wire which is embedded in a horizontal plane within or beneath the surface of the vehicle approach lane. Changes in the magnetic field produced by the undercarriage of the vehicle are sensed by the detector, and used to alert personnel within the restaurant. Alternatively, the loop detector may be buried or embedded in the vehicle approach lane adjacent the pick-up window. As noted above, the sensor of the present invention is intended to replace this type of sensor installation. As used herein, the term "transaction station" has reference to a particular position along the vehicle approach lane either at some distance from the pick-up window, such as the menu board location described above, or a position adjacent the pick-up window.

In a preferred embodiment, the present invention includes monitor means, shown generally at 7, which produces an electrical signal upon the arrival of a motor vehicle at the transaction station. As illustrated in FIG. 1, monitor means 7 is positioned beneath the pick-up window so as to sense the approach of the metallic side doors or panels of vehicle 6.

Upon detection of vehicle 6 by monitor means 7, specific visual and audible displays to be described in more detail hereinafter may be provided on a suitable display panel, shown generally at 8, mounted within the restaurant in clear view of personnel working at the pick-up window station. As will be noted, display panel 8 continually apprises the personnel of the arrival and duration of stay of vehicles at the transaction station.

The processing associated with the apparatus of the present invention is illustrated in the block diagram of FIG. 2. Monitor means 7 comprises a vehicle detector 9 of a construction to be described in more detail hereinafter, which provides an electrical signal designated generally VEHICLE PRESENT upon the arrival of a motor vehicle at the transaction station. In the preferred embodiment illustrated, the VEHICLE PRESENT signal subsists as long as vehicle detector 9 continues to sense the presence of the vehicle.

As soon as the VEHICLE PRESENT signal occurs, a pair of counters designated 10 and 11, respectively, are unlatched, permitting them to count TIME BASE signals produced by time base generator 12, these signals occurring at one second intervals. The TIME BASE signals are produced by time base generator 12 from the 60 Hz line to insure good accuracy. Counter 10 produces a count corresponding to the duration of stay of a particular vehicle at the transaction station. Counter 11 provides a count corresponding to the total time of duration of successive vehicles at the transaction station. Approximately four seconds later, counter 13 increments to provide a count corresponding to the total number of vehicles arriving at the transaction station, while providing sufficient delay to exclude vehicles which merely drive past the station without stopping.

The output from counter 10 corresponding to the duration of stay of the present vehicle at the transaction station is displayed on a visual digital display 14. Similar digital displays designated 15 and 16, respectively, are used to display the total accumulated vehicle duration time and the vehicle count. All of displays 14–16 may be disabled or blanked by the LOW VOLTAGE DISABLE signal if the AC voltage supplying the electronics is lost and the system is being powered via the back-up battery in order to conserve power and extend battery life.

A digital decoder 17 monitors the output code from duration of stay counter 10 and activates a visual alarm 18 and a first audible alarm 19 when the vehicle has been present at the transaction station for a user-programmable period of time of 0–49 seconds, or a period of 50 seconds, whichever is shorter. This represents the goal or objective time. At a predetermined length of time after arrival of the vehicle, for example two minutes, a second audible or visual alarm 20 is activated to alert the operating personnel that the vehicle has been at the pick-up window for a time exceeding the maximum allowable time.

It will be observed that current vehicle time display 14, and the visual and audible alarms 18–20 are positioned within the restaurant so as to be easily visible and audible to operating personnel. However, the accumulated time display 15 and the vehicle count display 16, and their respective resetting circuits, are positioned so as to be only accessible to and resettable by management personnel in order to prevent tampering.

A specific implementation of the system illustrated in FIG. 2 comprising the present invention is illustrated in the schematic diagram of FIG. 3A–FIG. 3D. Vehicle detector 9 includes a generally rectangular inductive loop detector 21 of a construction to be described in more detail hereinafter. The electrical conductors 22 and 23 comprising the terminals of loop detector 21 are connected to the inputs of digital loop detector amplifier 24 which produces a zero going output at its output terminal when the magnetic field associated with loop detector 21 is disturbed by a ferrous object of substantial size, such as a motor vehicle. Detector amplifier 24 may be of the type described in U.S. Pat. No. 3,875,555 issued Apr. 1, 1975 to T. R. Potter, or a Model 9410 Digital Loop Detector manufactured by Detector Systems, Inc. of Cyprus Calif. The zero going output signal from detector amplifier 24 is buffered and level shifted by resistor R1, resistor R2, cpacitor C1, and logic inverters Z1 and Z2, in order to produce a zero going signal at the output of inverter Z2 which will remain at a low level as long as the vehicle is detected by loop detector 21. A reset signal may also be supplied to the reset terminal of detector amplifier 24 by means of detector reset switch SW1.

The output of inverter Z2 is connected to one input of OR gate Z4. The remaining input of OR gate Z4 is connected to the output of inverter Z5 and the input of inverter Z6. The signal appearing on this line forms a power-up reset signal through the delay network formed by resistor R6, capacitor C2 and diode D1 in order to insure that the subsequent processing circuitry is initialized in the proper state. Normally, the power-up reset signal will be in the low or ground state. The output from inverter Z6 is connected through resistor R7 to driver transistor Q2, the collector of which is connected to the cathode of light emitting diode D2 (FIG. 3C) which forms part of an optical isolater in conjunction with light sensitive transistor Q3. The signal appearing at the collector of transistor Q3 also forms a part of the power-up reset signal, and will be a low level under normal operating conditions.

The output from OR gate Z4 forms the VEHICLE PRESENT signal described hereinabove in connection with FIG. 2, and is applied to the reset terminals of counters Z7 and Z8, as well as to the input of inverter Z9. The output of inverter Z9 is coupled through resistor R8 to the base of driver transistor Q4, the collector of which is connected to the cathode of light emitting diode D3 (FIG. 3C), which forms an optical isolator pair in conjunction with light sensitive transistor Q5. The signal appearing at the collector of transistor Q5, as well as the signal appearing at the output of OR gate Z4, both of which represent the VEHICLE PRESENT signal, are normally high levels, and will become low levels when a vehicle is detected by loop detector 9.

A low voltage alternating signal, which may be produced by a transformer or the like (not shown) is provided to primary power input terminals 25 and 26. A main power on/off switch SW2 may also be provided. A full wave bridge rectifier composed of diodes D4–D7 provides a full wave rectified alternating voltage on output line 27 which is filtered by capacitors C3 and C4, to form the detector amp supply voltage $V_2$, and is also applied to voltage regulator Z10. The output from regulator Z10 is further filtered by capacitor C5, and applied through diode D9 to filter capacitors C15 and C16 to form supply voltage $V_1$.

A pair of diodes D10 and D24 are connected between the positive supply voltage $V_1$ and the positive terminal of auxiliary supply battery B1. A resistor R11 and zener diode D25 are connected serially between the junction of diode D24 and battery B1, and the base of resistor Q6. A resistor R10 is connected between the base terminal and emitter terminal of transistor Q6, while a resistor R9 is connected between voltage $V_1$ and the collector of the transistor. A light emitting diode D8 is connected across transistor Q6 to provide a visual battery monitor with the cathode of the LED forming the BATTERY MONITOR line.

In the event supply voltage $V_1$ falls below a predetermined level, the voltage supplied by battery B1 through diodes D10 and D24 may be used to supply power to the system electronics. The back-up battery feature may be disabled by opening normally closed switch SW6. In addition, battery B1 receives charging current through the path established by resistor R9, LED D8, resistor R10, diode D25 and resistor R11. The degree of charging current may be monitored by the brightness of LED D8. Diode D8 may also be illuminated for test purposes by grounding the BATTERY MONITOR line as will be described in more detail hereinafter. In the event battery B1 is properly charged, current flow will be provided through zener diode D25 to turn transistor Q6 on and maintain LED D8 in an unilluminated condition. If the battery voltage is too low, however, transistor Q6 will remain off and LED D8 will be illuminated.

The low voltage alternating voltage at terminals 25 and 26 is also filtered by capacitor C6 and resistor R13, and applied to light emitting diode D11 which forms part of an optical isolater in conjunction with light sensitive transistor Q7. A reverse biased diode D12 is connected across light emitting diode D11. The collector of transistor Q7 is connected through resistor R14 to supply voltage V1, and to the input of Schmitt trigger Z12. This construction permits an oscillating signal having a frequency corresponding to the line frequency at terminals 25 and 26 to appear on the output of Schmitt trigger Z12. This signal is applied to the clock input of counter Z13, which is connected by means of output Q6, resistor R15 and capacitor C7 to form a divide by six counter. The output from counter Z13 is connected to the clock input of counter Z7 which forms a divide by ten counter. Consequently, counters Z7 and Z13 together form a divide by sixty counter so that the output from counter Z7 forms the TIME BASE signal referred to hereinabove occurring at a one second repetition rate. This signal is applied to the clock input of counter Z8, and the input of logic inverter Z14. The output from inverter Z14 is applied through resistor R16 to the base of transistor Q8. The collector of transistor Q8 is connected to the cathode of light emitting diode D11 (see FIG. 3C) which forms a portion of an optical isolator in conjunction with transistor Q1. The collector of transistor Q1 is connected through resistor R17 to supply voltage V1, and through resistor R18 and inverters Z27 and Z27A to also form the TIME BASE signal.

It will be observed that when a vehicle is not present at the transaction station so that the VEHICLE PRESENT signal is a logic high level, counter Z7 will be reset to inhibit the TIME BASE signal. However, when loop detector 9 detects the presence of a vehicle causing the VEHICLE PRESENT signal to become a logic low level, counter Z7 is released, thereby permitting the TIME BASE signal to be produced. At the same time, counter Z8, which returns the Q4 output to the enable input through resistor R45 and capacitor C15, is released, and causes a high logic level VEHICLE COUNT signal to occur after four TIME BASE signals or four seconds have occurred. This signal is applied to the clock input of counter Z16 (see FIG. 3B).

The Q3 output from counter Z16 is connected to the enable input of counter Z18, which has its Q3 output connected to the enable input of counter Z19, which has its Q3 output connected to the enable input of counter Z20. Together, cascaded counters Z16 and Z18–Z20 form a digital counter comprising the vehicle counter 13 described hereinabove. The outputs from the counters are decoded by display drivers Z21–Z24, respectively, which serve to drive the digital light emitting diode displays comprising vehicle count display 16. In operation, each time a vehicle arrives at the transaction station and is detected by loop sensor 21, a VEHICLE PRESENT signal will be produced, thereby causing a single VEHICLE COUNT signal which will increment counter 13 by one count. The total accumulated vehicle count will then be displayed on vehicle count display 16. Counter Z16 and Z18–Z20 may be reset by applying a high logic level on the output of OR gate Z25 (FIG. 3A). This may occur when either a power-up reset signal is produced when power is initially applied in order to be certain that the counter sets in the proper state, or when the counter reset switch SW3 is depressed, thereby producing a positive logic level at the input of OR gate Z25 through the combination of resistor R19, resistor R20, capacitor C8 and inverter Z26.

The output from counter Z7 is also applied to the count input of counter Z28, which may be a Mostek model number MK50398N six digit counter. Counter Z28 will count time base pulses and consequently provide an accumulated count of the total time a vehicle is present corresponding to counter 11 in FIG. 2. Digital outputs from counter Z28 are applied to digital light emitting diode accumulated time display 15. Counter Z28 may be reset by applying a high level to the clear input under the same conditions described hereinabove in connection with the reset of vehicle counter 13.

The TIME BASE signal is also supplied to the clock input of counter Z29 (FIG. 3C), the Q3 output of which is connected to the enable input of counter Z30, which also has its Q3 output connected to the enable input of counter Z31. Together, counters Z29–Z31 form a cascaded digital counter corresponding to current vehicle time counter 10 described in connection with FIG. 2. The outputs from counter 10 are applied to display drivers Z32–Z34, respectively, to drive the digital light emitting diode displays comprising current vehicle time display 14. In operation, when the vehicle arrives at the transaction station, TIME BASE signals will be produced which will cause counter 10 to establish a count corresponding to the number of seconds that the vehicle has been at the pick-up window. This count causes the current vehicle time display to provide a visual display of the actual time that the vehicle has been at the transaction station.

The digital outputs from counter Z29–Z31 are also decoded by decoder 17 which comprises diodes D12–D18 and D20–D21, and digital selector switch SW4. By closing the appropriate combination of individual switches of SW4 to connect the anodes of corresponding diodes D12–D18 together, a low logic level may be produced at the junction of resistors R21 and R22 when the appropriate output code appears on the output of counter 10. For example, if individual selector switches 1, 2 and 4 are closed, a low logic level will be produced at the junction of resistors R21 and R22 at a count of seven, corresponding to a time delay of seven seconds after the vehicle has arrived at the pick-up window. This logic signal is filtered by capacitor C9, buffered by logic inverter Z35, and supplied through NAND gate Z36 to the clock input of D flip-flop Z37 (FIG. 3D). It will be observed that flip-flop Z37 is enabled by the VEHICLE PRESENT signal, and will be set at the appropriate count of counter 10 as decoded by decoder 17. A pair of diodes D26 and D27 decode the Z30 $Q_0$ and $Q_2$ states corresponding to a count of 50, and supply a corresponding wire OR'ed logic signal thorugh the network formed by resistors R51 and R52, and capacitor C17 to inverter Z11 and the remaining input of NAND gate Z36.

The outputs from counter 10 are also decoded by diodes D20 and D21, which cause a digital low level at the junction of resistors R23 and R24 at a count of one hundred twenty, corresponding to a time delay of two minutes after a vehicle has arrived at the transaction station. This signal is filtered by capacitor C10, and buffered by logic inverter Z38 to trigger a monostable multivibrator formed by C18, R53 and Z39 and set a latch formed by cross coupled NOR gates Z40 and Z41, which had previously been reset by a signal on the remaining input of NOR gate Z40. Consequently, a logic high level will be produced at the output of the latch corresponding to the output of NOR gate Z40 two minutes after the arrival of the vehicle.

The $Q_0$–$Q_3$ outputs from counter Z29 are also decoded by diodes D28–D31 to provide a signal through the network formed by resistors R54 and R55, capacitor C19, and OR gate Z43 for resetting the latch formed by NOR gates Z40 and Z41 at a count of 15 seconds. This reset feature may be defeated by connecting juniper J1 to ground. In any event, the latch will be reset at the next vehicle present signal applied through OR gate Z43.

The Q output from flip-flop Z37 is applied to an input of AND gate Z42, with the other input being of AND gate Z42 connected to the TIME BASE signal. The output of AND gate Z42 is connected to one input of inverter Z44. The output from logic inverter Z44 is connected through resistors R25 and R26 to driver transistor Q10 which drives visual alarm lamp 28. The output from latch element Z40 is coupled through resistor R56, driver transistor Q20 and resistor R57 to the base of resistor Q10, and serves to terminate the flashing of lamp 28. Consequently, at a predetermined time after the vehicle has arrived at the transaction station as determined by the setting of SW 4, flip-flop Z37 will be enabled to permit the TIME BASE signal to drive alarm lamp 28 in a flashing manner to indicate that a vehicle has been present at the transaction station for the programmed period of time.

At the same time, counter Z45 is enabled through AND gate Z46 from the Q output of flip-flop Z37, and also commences counting TIME BASE signals. The output from AND gate Z46 is also connected to one input of NAND gates Z47 and Z48, respectively. These NAND gates in conjunction with resistors R27 and R28, and capacitors C11 and C12, form a pair of oscillators. The values of the resistors and capacitors are chosen such that each oscillator will exhibit a different frequency of oscillation.

After counter Z45 reaches a desired count, (for example, in the case illustrated a count of 15 as decoded by diodes D32–D35), the signal from the junctions of D32–D35 and R58 is fed back through inverter Z49 to inhibit AND gate Z46, and produce a logic low output therefrom. This action stops the oscillation of the oscillators formed by NAND gates Z47 and Z48. It will be understood that other states may be decoded for other time periods.

The output from NAND gate Z47 is connected to one input of NOR gate Z50, while the other input is connected to the TIME BASE signal. Similarly, the output of NAND gate Z48 is connected to one input of NOR gate Z51, while the other input is connected through logic inverter Z52 to the TIME BASE signal. The output from the NOR gates are combined in OR gate Z53, and applied to one input of AND gate Z54. The remaining input to AND gate Z54 is normally held at a high logic level. The output from AND gate Z54 is connected to one input of OR gate Z55. The output of OR gate Z55 is connected to an amplifier formed by resistors R29–R31, diode D22, and transistor Q11. The output of this amplifier is applied to a loud speaker 29.

The output from the latch formed by NOR gates Z40 and Z41 is also applied to one input of NAND gate Z56 which, in conjunction with resistor R32 and capacitor C13, forms an oscillator. The values of the passive components associated with the oscillator will be chosen to produce a frequency of oscillation different from those associated with the above mentioned oscillators. The output of this oscillator is buffered by logic inverter Z57 and applied to the other input of OR gate Z55. Jumper J2 may be connected to ground to defeat the second alarm 20, if desired.

In operation, commencing a predetermined time after the arrival of a vehicle at the transaction station as determined by the setting of SW4, flip-flop Z37 will be enabled to enable the oscillators formed by NAND gates Z47 and Z48 which comprise first audible alarm 19. During one half cycle of the TIME BASE signal one of the oscillator signals will be gated through gates Z53–Z55 to speaker 29. Likewise, during the other half cycle of the TIME BASE signal, the other oscillator signal will be gated through to the speaker. Consequently, an audible two tone varying signal will be produced to alert the operating personnel that a vehicle has been present for a period of time exceeding the time preset by switch SW4.

One to fifteen seconds after this sequence commences, counter Z45 will cause the signal from AND gate Z46 to inhibit the first audible alarm 19. Consequently, the warbling tone only lasts for a short period.

However, after a period of two minutes when the latch formed by NOR gate Z40 and Z41 is set, the third oscillator, which comprises second audible alarm 20, will be enabled, thereby permitting a continuous tone to be produced from speaker 29 to alert the operating personnel that the maximum allowable time has been exceeded. At the same time, the alarm lamp 28 is extinguished. If desired, the alarm tone produced by second audible alarm 20 may be caused to sound for a predetermined length of time rather than continuously. If an audible signal at two minutes is not desired, a visual alarm option is provided. In the latter case, alarm lamp 28 is caused to stop flashing and remain continuously illuminated via transistor Q12 until the vehicle leaves.

In some instances it may also be desirable to disable the operation of the speaker. This may be accomplished by switch SW5 which sets D flip-flop Z58 through logic inverter Z59, capacitor C14, and resistors R33 and R34. Flip-flop Z58, which has previously been set by the power-up reset signal, is now reset to inhibit signals from the first audible alarm 19 through AND gate Z54. However, the output from the oscillator comprising the second audible alarm 20 is not inhibited under these circumstances. A visual indication of the speaker disablement may be provided by light emitting diode D23 which is driven by the amplifier comprising resistors R35, R36 and transistor Q12.

Under some circumstances, such as a power failure, it is desirable to retain the data stored in the various counter memories. This may be accomplished by means of auxiliary battery B1 as explained hereinabove. The battery condition can be monitored by closing battery monitor switch SW3 which turns on transistor Q13 through resistor R59 to apply a ground level to the BATTERY MONITOR line. Lack of proper battery voltage will cause LED D8 to become illuminated. In addition, to avoid excessive battery drain caused by the light emitting diode displays, it has also been found desirable to blank the displays during low line voltage operation. This may be accomplished by applying the LOW VOLTAGE DISABLE signal to the blanking terminal of display drivers Z21–Z24 in order to blank or disable the VEHICLE COUNT display 16. Similarly, this signal is applied to the $\overline{\text{SET}}$ input of counter Z28 in order to inhibit the accumulated time display 15. The LOW VOLTAGE DISABLE signal is produced by the network composed of logic inverters Z15 and Z17, diode D37, resistor R60, and capacitor C20. Low primary voltage will cause cessation of the oscillating clock signal at the output of Schmitt trigger Z12 which will cause a constant high level to be applied to the input of inverter Z17. The logic low level thus produced at the output of inverter Z17 serves to blank the displays as described hereinabove. This feature may be deleted by adding the jumper illustrated at 30.

To further insure that the memory elements of the circuit are in the proper initial state power turn-on, the power-up reset signal may be applied from the collector of transistor Q3 through resistors R39 and R40 to the set terminal of D flip-flop Z58, and to one input of OR gate Z59. The output of OR gate Z59 is connected to the reset inputs of the counters forming the current vehicle time counter 10. In addition, the VEHICLE PRESENT signal may be supplied through logic inverter Z60, capacitor C14, and resistor R41 to the remaining input of OR gate Z59. Consequently, counter 10 will be reset upon the initial application of power, and also at the start of the VEHICLE PRESENT signal, thereby initiating a new duration time for counter 10. It will further be observed that when the vehicle leaves the transaction station, thereby causing a cessation of the VEHICLE PRESENT signal, the TIME BASE signal will cease, thereby causing counter 10 and its associated current vehicle time display 14 to hold the displayed time which the last vehicle spent at the transaction station.

A preferred construction for vehicle detector 9 is illustrated in FIG. 4 and FIG. 5. The loop detector 21 comprises a generally rectangular-shaped flat coil having a plurality of turns of electrically conducting wire, one of which is shown at 31, the ends of the wire forming loop detector terminals 22 and 23, respectively. It has been found, for example, that 19 turns of No. 18 AWG UL style 1015 hook up wire having a height of 17.5 inches and a width of 24.5 inches spaced about 6.5 inches from the building wall provides excellent results. Loop detector 21 is enclosed in a box-like enclosure 32 of substantially trapezoidal cross section having a generally planar front face 33 which will preferably be constructed of a material which will not interfere with the inductive or magnetic field produced by loop detector 21. A pair of spaced end portions 34 slope rearwardly and outwardly from the end edges of front face 33. A pair of spaced top and bottom portions 35 extend rearwardly and outwardly from the top and bottom edges, respectively, of front face 33. The outermost edges of end walls 34 and top and bottom walls 35 terminate in outwardly directed flanges forming a peripheral flange 36 extending around the rear periphery of enclosure 32. Flange 36 may be provided with means such as holes, one of which is shown at 37, for mounting enclosure 32 to building wall 2 with screws or the like, such that front face 33 extends substantially perpendicularly to the ground and is spaced outwardly from the building wall toward vehicle approach lane 5 about 6 inches as illustrated in FIG. 1.

As best shown in FIG. 5, loop detector 21 is secured to the inner surface of front face 33 by any convenient means such as adhesive or the like such that when enclosure 32 is mounted to the building wall, loop detector 21 is substantially vertical, or in other words, the normal axis of the loop detector (shown generally at 38 in FIG. 5) is generally parallel to the ground. As shown in FIG. 1 and FIG. 5, the enclosure is mounted such that the loop detector 21 may sense the side, shown diagrammatically at 39, of motor vehicles passing within a predetermined distance D of the loop detector. Enclosure 32 may be fabricated of a suitable maintenance free plastic material such as Plexiglas or the like, and may be formed of a unitary construction by molding or casting. The coil may be impregnated in an epoxy potting compound 21a to prevent vibration between coil loops which could cause erratic operation in the event the detector housing is jarred or bumped.

Vehicle detector 9 is also provided with shielding means for preventing interference with the inductive field produced by loop detector 21 caused by metallic objects approaching the rear side of the loop detector, such as objects which may be moved within the restaurant building. This means comprises a sheet-like plate 40 of any suitable magnetic shielding material such as steel or the like. Plate 40 is secured to flange 36 at the rear peripheral edge of enclosure 32 so as to be spaced from the rear side of the loop detector 21. It will be further observed that plate 40 is dimensioned larger than loop detector 21 so that the plate extends beyond the peripheral edges projected rearwardly of the loop detector. This further ensures shielding for metallic objects moving to the rear of the detector.

It will be understood that other types of mounting means may be provided with enclosure 32 so that the vehicle detector 9 may be mounted at other locations adjacent the vehicle approach lane 5, such as on a post or auxiliary structure, or upon or next to a menu board of the type described hereinabove. It will further be observed that enclosure 32 permits loop detector 21 to be spaced from the building wall, further reducing the possibility of false indications, and also permits the loop detector to be spaced closer to the anticipated path of travel of the vehicle. To further ensure that the vehicle approaches the detector within a distance so as to cause disturbance of the inductive field, a curb 41 (see FIG. 1) or other obstruction may be placed along approach lane 5.

As noted hereinabove, it is desirable to provide certain display and reset functions only to management or supervisory personnel in order to prevent tampering. A preferred embodiment for accomplishing this is illustrated in FIG. 6 and FIG. 7 in association with display panel 8. As illustrated in FIG. 6, the current vehicle time display 14, warning light 18, and audible alarm speaker 29 are mounted on the front of a door assembly 8a which is hingedly secured by means of hinge 8b to the display panel 8. Consequently, these functions are available to operating personnel within the store premises. The door 8a may be locked by means of a key lock or the like 8c in order to prevent unauthorized entry.

The rear of the door assembly 8a is illustrated in FIG. 7. This assembly mounts accumulated time display 15, vehicle count display 16, detector reset switch SW1, main power switch SW2, battery monitor lamp D8, program time switch SW4, and warning tone disable switch SW5. It will be understood that these displays and the associated reset and power switches are accessible only to authorized employees such as managerial or supervisory personnel having a suitable key for accessing lock 8c. It will be further understood that the limited access displays and switches may also be mounted within the cabinet structure itself, or at a point remote from the display panel 8. In addition, satellite displays incorporating current vehicle time display 14 and the various alarm warning devices may be located at positions remote from main display panel 8 for the convenience of other operating personnel within the business store.

It will be understood that various changes in the details, materials, steps and arrangements of parts, which have been herein described and illustrated in order to explain the nature of the invention, may be made by those skilled in the art within the principle and scope of the present invention. For example, while for purposes of an exemplary showing, the present invention has been described and illustrated in connection with a drive-in restaurant, it also finds applicability with other types of businesses such as a drive-thru bank. In this situation, the monitor means as shown in FIG. 1 may be conveniently placed beneath a drawer shown schematically at 42 used to convey objects to the waiting vehicle.

It will also be understood that the present invention may be incorporated within otherwise conventional business record keeping equipment located on the business premises, such as a point of sale cash register system. In this application, the timer means of the present invention will be incorporated with the time of day timer of the cash register, while the display means would be either a separate display, or the printing system associated with the cash register tape. Various visually or audibly sensible alarms and displays may be positioned remote from the cash register in a manner similar to that described hereinabove in connection with the preferred embodiment disclosed.

The embodiments of the invention in which an exclusive property or privilege is claimed are as follows:

1. Apparatus for monitoring the arrival and duration of stay of a motor vehicle at a transaction station associated with a drive-in business or the like of the type having a building structure including a vertical wall mounting a drive-in window, and a vehicle approach lane positioned alongside the building structure wall, said apparatus comprising:

monitor means producing an electrical signal upon the arrival of a motor vehicle at the transaction station;

means responsive to said electrical signal for timing a duration of stay commencing with the arrival of the vehicle at the transaction station; and means responsive to said timing means for providing a visually sensible display of said duration of stay.

2. The apparatus according to claim 1 wherein the transaction station comprises the drive-in window, including means for mounting said monitor means beneath the drive-in window.

3. The apparatus according to claim 1 wherein said monitor means comprises a loop detector having a plurality of turns of wire.

4. The apparatus according to claim 3 including means for mounting said loop detector at a position vertically spaced above the ground adjacent the vehicle approach lane.

5. The apparatus according to claim 4 wherein said loop detector is oriented vertically such that the normal axis of the loop is substantially parallel to the ground.

6. The apparatus according to claim 5 including means responsive to said loop detector for producing said electrical signal when a motor vehicle comes within a predetermined distance of said loop detector.

7. The apparatus according to claim 5 including shielding means associated with said loop detector for preventing said electrical signals being produced by metallic objects adjacent the rear side of the loop detector facing away from the vehicle approach lane.

8. The apparatus according to claim 7 wherein said shielding means comprises a plate spaced from the rear side of said loop detector formed from a magnetic shielding material.

9. The apparatus according to claim 8 wherein said mounting means includes a box-like housing having a front face, said loop detector being mounted to the inner wall of said front face, said plate being mounted to said enclosure and spaced rearwardly from said loop detector.

10. The apparatus according to claim 9 wherein said enclosure is fabricated from a magnetic radiation transmissive plastic material.

11. The apparatus according to claim 8 wherein said plate is dimensioned to extend beyond the peripheral edges projected rearwardly of said loop detector.

12. The apparatus according to claim 1 including means to reset said timing means upon the arrival of a subsequent vehicle at the transaction station.

13. The apparatus according to claim 12 including means for displaying the total time duration of stay of a previous vehicle until the arrival of a subsequent vehicle at the transaction station.

14. The apparatus according to claim 1 including means for producing a sensible alarm when the duration of stay of a vehicle at the transaction station reaches a predetermined time limit.

15. The apparatus according to claim 14 wherein said alarm means includes visually sensible alarm means.

16. The apparatus according to claim 14 including means for activating said visually sensible alarm means at a first predetermined time after arrival of the vehicle at the transaction station.

17. The apparatus according to claim 16 including means for deactivating said visually sensible alarm means at a second predetermined time after arrival of the vehicle at the transaction station.

18. The apparatus according to claim 14 wherein said alarm means includes audibly sensible alarm means.

19. The apparatus according to claim 18 wherein said audibly sensible alarm means includes means for producing a first audibly sensible alarm signal when the duration of stay of a vehicle at the transaction station reaches a first predetermined time limit and means for producing a second audibly sensible alarm signal audibly distinct from said first alarm signal when the duration of stay of a vehicle at the transaction station reaches a second predetermined time limit greater than said first time limit.

20. The apparatus according to claim 19 wherein said first audible alarm signal comprises two audibly distinct tone frequencies.

21. The apparatus according to claim 19 including means for terminating said first alarm signal at a predetermined time after arrival of the vehicle at the transaction station.

22. The apparatus according to claim 1 including means for totaling the time duration of stay of successive vehicles at the transaction station.

23. The apparatus according to claim 22 including means responsive to said totaling means for displaying said total time duration.

24. The apparatus according to claim 22 including means accessible only to authorized personnel for resetting said totaling means.

25. The apparatus according to claim 1 including means for totaling the number of vehicles arriving at the transaction station.

26. The apparatus according to claim 25 including means responsive to said totaling means for displaying the total number of vehicles arriving at the transaction station.

27. The apparatus according to claim 25 including means accessible only to authorized personnel for resetting said totaling means.

28. The apparatus according to claim 1 wherein said monitor means comprises means for magnetically detecting the arrival of the vehicle at the transaction station; said timing means includes means for timing the duration of stay of the vehicle at the transaction station, means to reset said timing means upon the arrival of a subsequent vehicle at the transaction station, means for totaling the time duration of stay of successive vehicles at the transaction station, and means for totaling the number of vehicles arriving at the transaction station; and said display means includes means for displaying said total time duration and means for displaying said total number of vehicles.

29. The apparatus according to claim 28 including means for producing a sensible alarm when the duration of stay of a vehicle at the transaction station reaches a predetermined time limit.

30. The apparatus according to claim 29 wherein said monitor means comprises a vertically oriented loop detector having its normal axis substantially parallel to the ground.

31. The apparatus according to claim 30 including means for mounting said loop detector beneath said drive-in window.

32. The apparatus according to claim 31 including said building structure, said drive-in window and said vehicle approach lane.

33. A method for monitoring the arrival and duration of stay of a motor vehicle at a transaction station associated with a drive-in business or the like of the type having a building structure including a vertical wall mounting a drive-in window, and a vehicle approach lane positioned alongside the drive-in window to improve the operating efficiency of business personnel comprising:
   sensing the arrival of a motor vehicle at a predetermined position in the vehicle approach lane;
   timing the duration of stay of the vehicle commencing with the arrival of the vehicle at said predetermined position; and
   providing to business personnel within the building a sensible indication of the duration of stay of the vehicle.

34. The method according to claim 33 including sensing the arrival of the motor vehicle at the transaction station.

35. The method according to claim 34 wherein the transaction station comprises the drive-in window, including positioning a motor vehicle sensor beneath the window.

36. The method according to claim 35 including providing means associated with the sensor for preventing false sensing indications caused by metallic objects within the building.

37. The method according to claim 36 including restricting travel of the motor vehicle within the travel lane so that the vehicle is forced to pass within a predetermined distance from the sensor.

38. The method according to claim 34 including sensing a metallic side of a motor vehicle passing next to the drive-in window.

39. The method according to claim 33 including timing the duration of stay of the vehicle at the transaction station.

40. The method according to claim 39 wherein the step of providing said sensible indication comprises displaying on a visually sensible display at a location visible to business personnel the time duration of stay of the vehicle at the transaction station.

41. The method according to claim 33 wherein the step of providing said sensible indication comprises displaying the time duration of stay on a visually sensible display.

42. The method according to claim 33 or 39 including totaling the duration of stay of a plurality of successive vehicles.

43. The method according to claim 42 wherein the step of providing said sensible indication includes displaying on a visually sensible display the total time duration.

44. The method according to claim 43 including positioning the visually sensible display at a location visible only to designated business personnel.

45. The method according to claim 33 including totaling the number of vehicles arriving at the transaction station.

46. The method according to claim 33 including totaling the number of vehicles sensed.

47. The method according to claim 45 or 46 wherein the step of providing said sensible display includes displaying on a visually sensible display the total number of vehicles served.

48. The method according to claim 33 including providing a sensible alarm when the duration of stay reaches a predetermined time limit.

49. The method according to claim 48 including providing a first sensible alarm when the duration of stay of a vehicle reaches a first predetermined time limit and providing a second sensible alarm when the duration of a stay of a vehicle reaches a second predetermined time limit greater than said first time limit.

50. The method according to claim 48 wherein said time duration is the time duration of the vehicle at the transaction station.

51. A sensor for sensing the arrival and duration of stay of a motor vehicle at a transaction station associated with a drive-in business or the like of the type having a building structure including a vertical wall mounting a drive-in window, and a vehicle approach lane positioned alongside the drive-in window, said sensor comprising:
   a loop detector having a plurality of turns of wire;
   a box-like enclosure having a front face configured to face the vehicle approach lane;
   first means for mounting said loop detector within said enclosure; and
   second means for mounting said enclosure to a mounting surface such that said loop detector may sense the side of a motor vehicle passing within a predetermined distance thereof.

52. The sensor according to claim 51 wherein said first and second mounting means are configured such that said sensor may be mounted in a vertical orientation with the normal axis of said loop detector spaced from and substantially parallel to the ground.

53. The sensor according to claim 52 including shielding means associated with said loop detector for preventing false sensing indications from metallic objects approaching the side opposite the front face of the enclosure.

54. The sensor according to claim 53 wherein said shielding means comprises a plate of magnetic shielding material positioned rearwardly of said loop detector.

55. The sensor according to claim 54 wherein said plate is dimensioned to extend beyond the peripheral edges projected rearwardly of said loop detector.

56. The sensor according to claim 55 wherein said enclosure includes a front face fabricated from a magnetic radiation transmissive material, said first mounting means mounting said loop detector to the inner surface of said face.

57. The sensor according to claim 56 wherein said enclosure is substantially trapezoidal-shaped in cross section such that said front face is smaller than said plate.

58. The sensor according to claim 57 wherein said enclosure includes spaced side and end portions extending rearwardly and outwardly from said front face, said enclosure being fabricated from a weather resistant plastic material.

59. The sensor according to claim 58 wherein said loop detector is substantially rectangular in shape.

60. The sensor according to claim 59 wherein said mounting means comprises an outwardly directed flange secured to the rear peripheral edge of said enclosure.

61. The sensor according to claim 51 wherein said loop detector is impregnated with a potting compound to prevent relative movement between the wire turns.

* * * * *